April 7, 1942.   P. ANDERSON   2,278,968
AUTOMATIC ARC WELDING HEAD
Filed Aug. 8, 1940   3 Sheets-Sheet 1

Perry Anderson
INVENTOR.

BY *(signature)*
ATTORNEY.

April 7, 1942.　　　P. ANDERSON　　　2,278,968
AUTOMATIC ARC WELDING HEAD
Filed Aug. 8, 1940　　　3 Sheets-Sheet 3

Perry Anderson
INVENTOR.

BY _____
ATTORNEY.

Patented Apr. 7, 1942

2,278,968

UNITED STATES PATENT OFFICE 2,278,968

AUTOMATIC ARC WELDING HEAD

Perry Anderson, Wauwatosa, Wis., assignor to A. O. Smith Corporation, Milwaukee, Wis., a corporation of New York Application August 8, 1940, Serial No. 351,870

1 Claim. (Cl. 219—8)

This invention relates to a drive for feeding electric arc welding electrodes or weldrods to a welding arc.

The principal object of the invention is to provide an automatic feed for welding electrodes operated by fluid pressure and in which the pressure differential between the fluid on the opposite sides of the regulator valve does not exceed a predetermined reasonably low value.

Another object of the invention is to provide an automatic weldrod feed operated by fluid pressure and in which the control valve is disposed in the inlet passage for fluid supplied to the pump.

Figure 1:
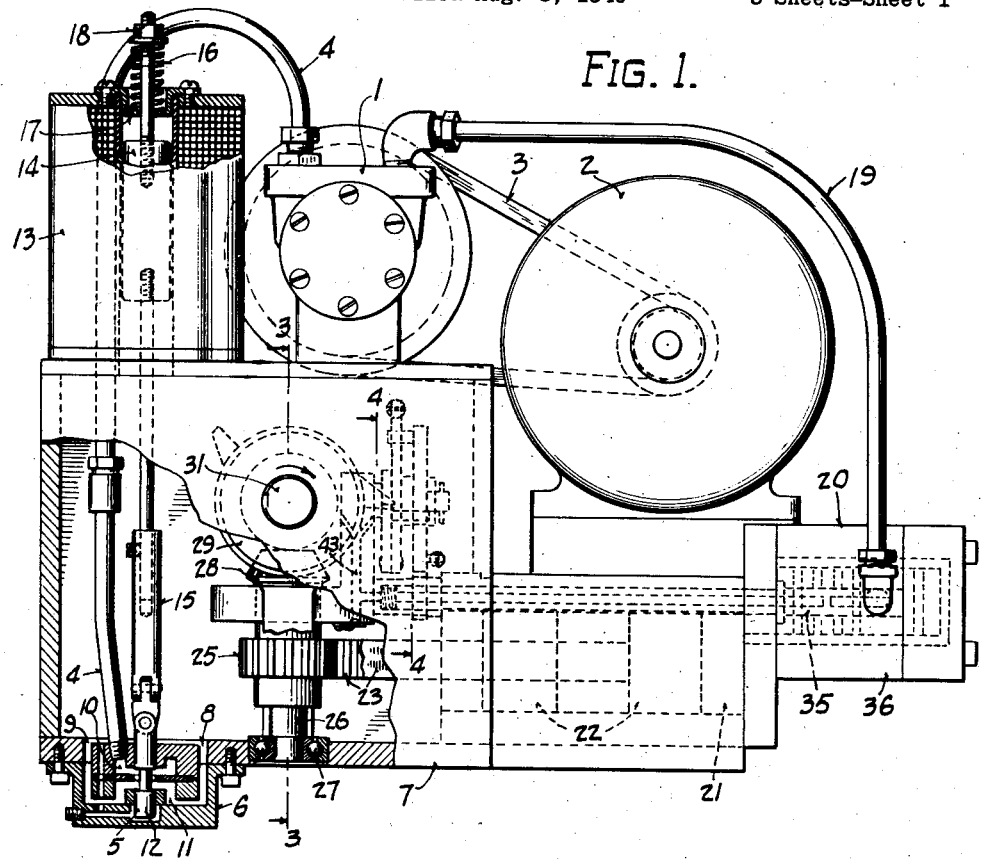
Figure 2:
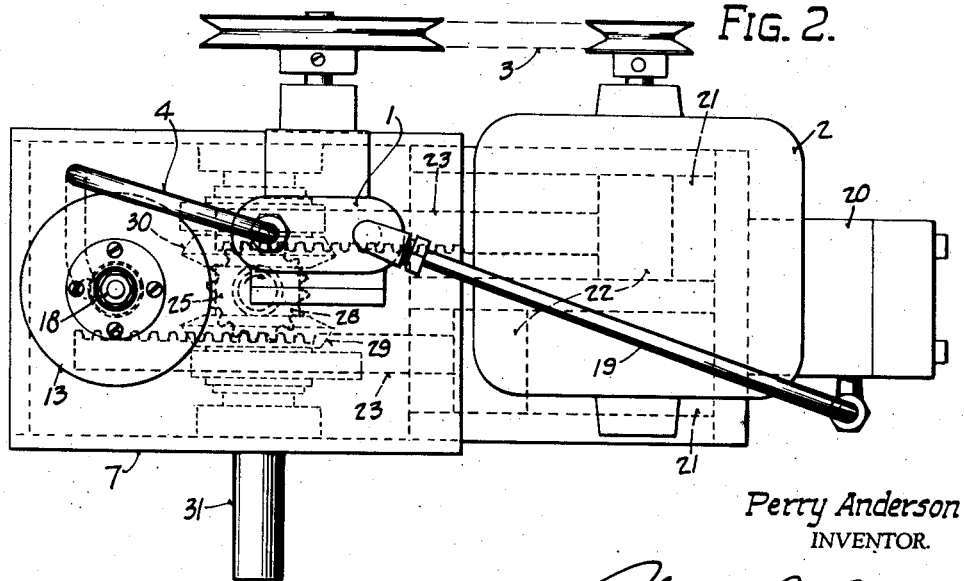
Figure 7:
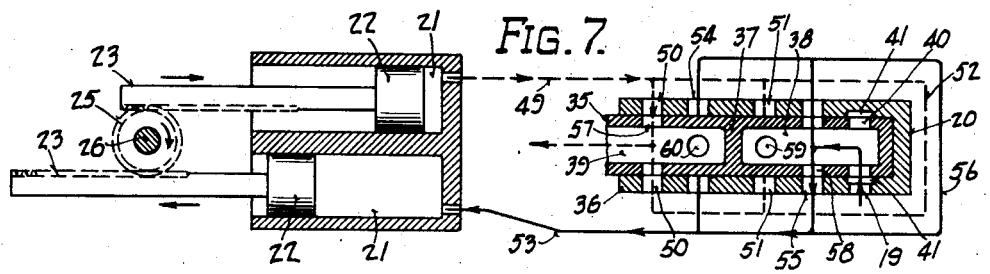
Figure 8:
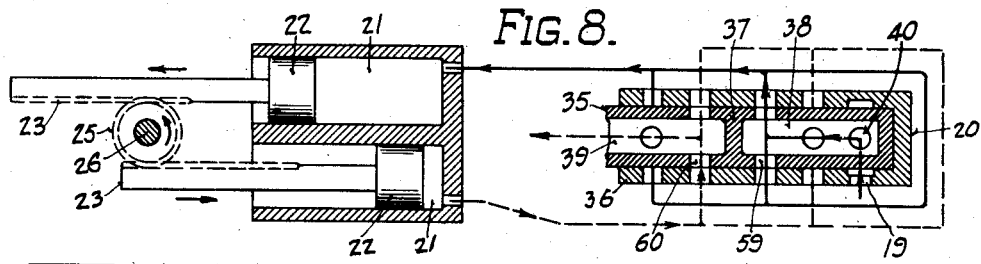
Figure 9:
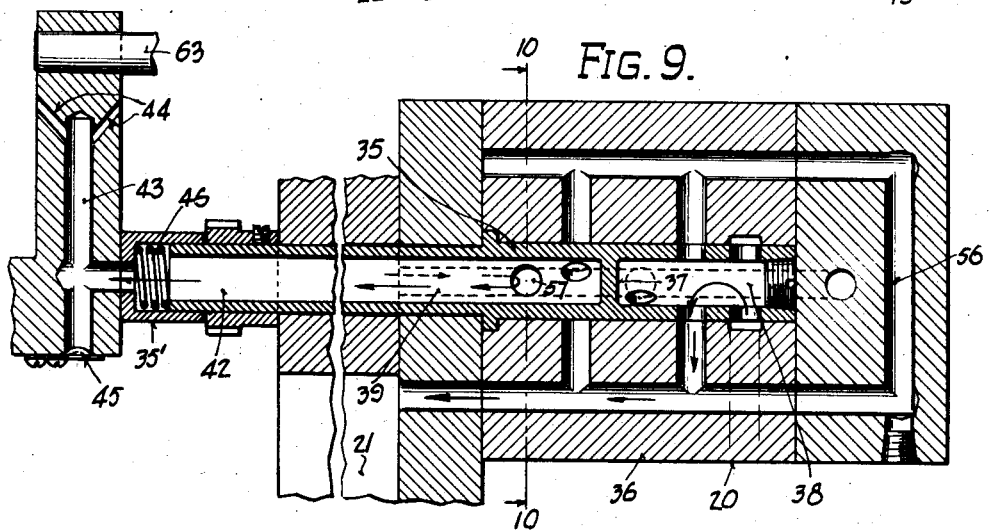
Figure 10:
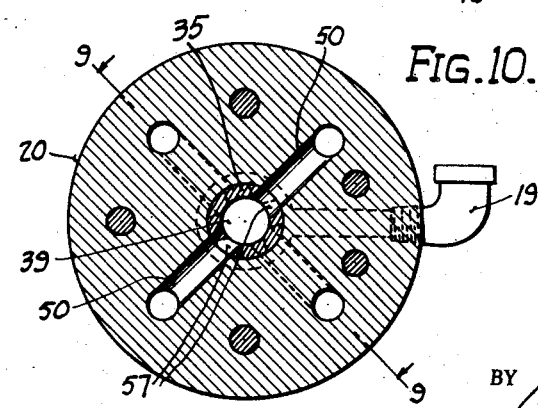

These and other objects of the invention will be clear from the following detailed description and the accompanying drawings illustrating the invention and in which:

Figure 1 is a side elevation, partly in section;
Fig. 2 is a top plan view;
Fig. 3 is a section on line 3—3 of Fig. 1;
Fig. 4 is an enlarged end view of the distribution valve reversing mechanism, looking from the left towards line 4—4 of Fig. 1;
Fig. 5 is a side view of the valve reversing mechanism looking from the right in Fig. 4;
Fig. 6 is a top plan view of the valve reversing mechanism;
Figs. 7 and 8 are somewhat diagrammatic representations of the pistons and distribution valve showing their relative positions at different points in the stroke;
Fig. 9 is a longitudinal section through the valve on line 9—9 of Fig. 10; and
Fig. 10 is a transverse section through the valve on line 10—10 of Fig. 9.

In its main elements the device illustrated comprises (1) a pump for supplying liquid under pressure driven at substantially constant speed by an electric motor or any other suitable source of power; (2) a magnetically controlled valve for regulating the supply of liquid to the pump; (3) a pair of cylinders fed with liquid from the pump to drive pistons at a speed proportional to the rate at which liquid is supplied; (4) mechanism for converting the reciprocating motion of the pistons into rotary motion for driving the weldrod feeding mechanism; and (5) a valve to control the distribution of liquid from the pump to the cylinders to reverse the motion of the pistons when they reach the ends of their strokes. The device may be considered as a variable speed transmission between the substantially constant speed pump and the weldrod feeding mechanism, the transmission ratio being varied in accordance with variations in an arc characteristic in such a manner as to maintain the characteristic substantially constant in value. While different arc characteristics may be used to control the drive, it is preferred to make use of the arc voltage. Its control over the rate of feed is exercised in such a manner as to maintain a substantially constant arc voltage.

The pump 1 for supplying liquid under pressure can be any suitable type of pump, preferably a rotary pump, driven by motor 2 through belt 3.

It is to be understood that while any suitable liquid can be used, a good grade of lubricating oil is to be preferred since this will serve not only for the hydraulic transmission of power, but also for the effective lubrication of the working parts.

The pump receives its supply of oil through intake pipe 4 running to the pump from the magnetically controlled valve 5. The valve housing 6 is located at the bottom of an oil sump in the casing or housing 7 and is provided with passages 8 and 9 to admit oil to the valve port 10 and the space 11 below the piston valve 12. The forces produced by the oil pressure on the piston valve 12 are thus balanced in a vertical direction and the valve is therefore readily operated by the solenoid 13 acting through its plunger 14 and connecting link 15. The plunger is normally biased upwards by spring 16 and when the solenoid is not energized, is pressed against stop 17 holding the piston valve 12 in such position as to prevent the passage of oil from the oil sump to the intake pipe 4. The solenoid is connected in parallel to the welding arc so as to be affected by the voltage across the arc. When the voltage is zero, the supply of oil to the pump is cut off as above described, and no motion is produced tending to feed the weldrod to the work.

An adjusting nut 18 is provided to enable the spring to be set at a suitable position for maintaining a desired voltage. If the weldrod burns away more rapidly than it is fed to the work, the welding arc lengthens, its voltage increases, and the increased voltage acts through the solenoid against spring 16 to increase the supply of oil to the pump and hence the speed at which the weldrod is fed to the work. The increased speed is maintained until the arc voltage is restored to its desired value. If, on the contrary, the arc voltage decreases, the rate of feed is diminished by decreasing the supply of oil to the pump until the voltage is increased to the desired value.

The device consequently operates to maintain a substantially constant voltage across the welding arc and can be set to hold the voltage found most suitable for the type of weldrod used and the kind of work being done.

By locating the control valve in the supply line to the pump the pressure differential to which the valve is subjected in operation is never in excess of the difference between the pressure on the fluid in the reservoir, which is normally atmospheric, and the maximum degree of vacuum created at the inlet to the pump when the valve completely closes the supply passage. This pressure differential is normally less than a few pounds per square inch and can never exceed fifteen pounds per square inch, the approximate atmospheric pressure.

From the pump 1, oil under pressure is supplied through pipe 19 and distributing valve 20 to two cylinders 21. Pistons 22 within the cylinders are secured to racks 23 which slide in guides 24 and engage opposite sides of pinion 25 on a shaft 26 rotatable in bearings 27. Reciprocation of the pistons and the racks causes the shaft 26 to rotate first in one direction and then in the opposite direction when the motion of the pistons is reversed by the distributing valve as hereinafter to be described. The upper end of shaft 26 carries a bevel gear 28 meshing with bevel gears 29 and 30 on shaft 31 running in bearings 32. The shaft 31 is the final drive from the device and is connected to feed rolls or chains for feeding weldrods, not shown in the drawings since the particular form of weldrod feeding mechanism used forms no part of this invention.

Free wheeling clutches 33 and 34 are interposed between the bevel gears 29 and 30, respectively, and shaft 31 to convert the alternating rotary motion of shaft 26 into continuous rotary motion of shaft 31. These clutches are not described in detail as clutches of this type are well known to the art and their construction forms no part of this invention. Each clutch is adapted to drive shaft 31 when the bevel gear to which it is attached rotates in a clockwise direction as seen from the left in Fig. 1, and to have no effect upon the shaft 31 when the gear rotates in the opposite direction. Thus, when the shaft 26 rotates in a clockwise direction as seen from above, shaft 31 is driven through bevel gear 29 and free wheeling clutch 33, as shown in Fig. 5, while gear 30 rotates freely on its clutch 34. When shaft 26 reverses, the drive is taken over by gear 30 and its clutch 34. Shaft 31 is thus continuously rotated in one direction irrespective of the direction of rotation of shaft 26.

There is no dead center in a hydraulic motor of this kind, and no variations in driving torque due to changes in angular relations of a connecting rod and crank. While the embodiment of the invention shown and described is that which is preferred, modifications may be made without departing from the spirit of the invention, as, for example, using two opposed cylinders at opposite ends of a single rack, or a double acting cylinder to drive one rack.

Reversal of the pistons at the ends of their strokes is effected by means of valve 20 which controls the distribution of pressure fluid to cylinders 21. The valve consists of a hollow sleeve 35 rotatable on its axis in the valve casing 36. A transverse partition 37 across the hollow in the sleeve forms two compartments 38 and 39, of which one, 39, is always in communication with the inside of housing 7 through chamber 42 and oil distributor 43 with oil jets 44 and relief valve 45. A spring 46 interposed between the end of sleeve 35 and an inturned flange of a snugly fitted telescopic extension 35' seats the extension against the oil distributor 43 and provides a rotary seal at the outer end of the sleeve. Pinion 47 meshing with gear sector 48 serves to rotate the valve on its axis and reverse the motion of the pistons in cylinders 21 as hereinafter explained.

The operation of the distribution valve is most readily understood by referring to Figs. 7 and 8 in which the parts in the rotary sleeve valve and its casing are shown in a somewhat diagrammatic manner. An oil line 49 joins the upper cylinder to diametrically opposed pairs of ports 50 and 51 in the valve casing, of which ports 50 can be put into communication with compartment 39 in the rotary valve, while the two diametrically opposed ports 51 can be put into communication with compartment 38. Opposite ports 50 and 51 are connected by passage 52 so as to balance the pressure on opposite sides of the valve sleeve and permit it to be readily rotated. An oil line 53 connects the lower cylinder to diametrically opposed pairs of ports 54 and 55 in the valve casing and can be put into communication with compartments 39 and 38 respectively. A passage 56 connects the opposite ports 54 and 55 to likewise balance the pressure.

In the configuration shown in Fig. 7, the rotary sleeve is turned so as to cause ports 57 and 58 in the sleeve to register with ports 50 and 55, respectively, in the casing, while all the other ports in the casing are cut off. Oil entering compartment 38 from the pump through oil line 19, annular groove 41, and ports 40 passes out through port 58 in the sleeve and ports 55 in the casing to oil line 53. The lower piston 22 is driven to the left, turning shaft 26 and driving the upper piston to the right. Oil from the upper cylinder passes through oil line 49 and ports 50 and 57 to compartment 39 from which it is discharged through oil jets 44 and relief valve 45 into the housing 7 where it collects as a pool from which oil is drawn by the pump through the magnetically controlled valve 5. The oil jets 44 are in sufficient number and are so directed as to project oil sprays to lubricate the moving parts of mechanism within the housing 7. The relief valve 45 is set to open at a pressure which will insure proper projection of oil through the jets, and by-passes the rest of the oil.

When the pistons have reached the ends of their stroke, the sleeve 35 is turned on its axis by means to be hereinafter explained in order to bring ports 59 and 60 in the sleeve into communication with ports in the casing. The motions of the pistons is thereby reversed as shown in Fig. 8. The pistons move alternately from left to right, imparting an alternating rotary motion to shaft 26 and continuous rotation to shaft 31. The speed of the pistons and hence that of shaft 31 is determined by the rate at which liquid is supplied to the cylinders, and this in turn is controlled by the arc voltage acting on control valve 5 through solenoid 13.

The mechanism for throwing the distribution valve from one operating position to the other is shown in Figs. 4 to 6 inclusive. A plate 61 and rocking lever 62 are mounted so as to be free to oscillate in their own planes on an axis defined by stud 63 rigidly secured to the oil distributor 43. The oscillating plate 61 has a gear sector 48 which engages pinion 47 on the sleeve valve 35 and rotates the sleeve when plate 61 is oscillated from one extreme position to the other. The plate 61 is held locked in its extreme positions by two pawls 64 held against the plate by spring 65 and engaging it in notches 66, 67, 68 and 69. In the position shown in Fig. 4, the oscillating plate is held against rotation on stud 63 by pawls 64 engaging notches 66 and 69. In its other extreme position, the plate is locked in position by engagement of the pawls with notches 67 and 68.

The rocking lever 62 is free to rotate on shaft 63 independently of the oscillating plate. Two arms 70 and 71, pivoted on the rocking lever at 72 and 73, respectively, are constantly pulled towards each other by spring 74. Two pins 75 project from the ends of the rocking lever to engage notches 76 in pawls 64. Another pin 77 is rigidly secured to the oscillating plate 61 to bear against one or the other of arms 70 and 71.

Two fingers 78 and 79 are rigidly secured to bevel gears 29 and 30, respectively. As the reciprocating motion of pistons 22 moves the bevel gear 28 first in one direction and then the other, gears 29 and 30 in mesh with it likewise oscillate about their common axis and swing the fingers 78 and 79 back and forth through arcs of circles. Referring particularly to Figs. 4 and 5, it will be seen that clockwise rotation of gear 29 will bring finger 78 into contact with abutment 80 on rocking lever 62 while the other finger 79 is being rotated away from the lever. Pressure of the finger on the rocking lever turns this clockwise as seen in Fig. 4, stretching spring 74 between arm 71, bearing against a sleeve on stud 63, and arm 70 pressing against pin 77 on the oscillating plate 61. No rotation is, however, imparted to the oscillating plate which is held locked in position by pawls 64 until pin 75 on the rocking lever engages notch 76 in the right hand pawl and forces it out of engagement with notch 69. The oscillating plate being thus disengaged, it is snapped over by spring 74 acting through arm 70 and pin 77. The oscillating plate is then held locked in its new position by engagement of pawls 64 with notches 67 and 68 until contact of finger 79 with the rocking lever 62 rotates the lever to release pawl 64 from notch 68 causing the oscillating plate 61 to shift back into the position in which it is shown in Fig. 4.

As the oscillating plate shifts from one position to the other, the gear sector 48 in engagement with pinion 47 rotates the valve sleeve 35 and changes the distribution of oil to cylinders 21, causing pistons 22 to reverse their direction of travel. The fingers 78 and 79 are fixed on the gears 29 and 30 in such angular relation as to reverse the pistons at appropriate points in the cylinders. The pistons travel periodically from one end of the cylinders to the other and impart to shaft 26 an oscillatory rotary motion which is converted, by means previously described, into continuous rotation of the shaft 31. This shaft, in turn, rotates the weldrod feeding mechanism and feeds the weldrod to the work at a rate to maintain substantially constant voltage across the welding arc.

I claim:

In an automatic feeding device for arc welding electrodes, fluid pressure operated feeding mechanism, a pump for supplying fluid under pressure directly to said mechanism, and a control valve responsive to a characteristic of the arc to regulate the supply of fluid to said pump, said valve being subjected to less than a maximum fluid pressure differential approximating the difference between the pressure of the fluid at its source and the pressure at the inlet to said pump.

PERRY ANDERSON.